C. F. HILGEMAN, J. C. PATTERSON & C. E. GRAHAM.
ARTICLE HOLDER.
APPLICATION FILED JAN. 17, 1916.
1,262,493.
Patented Apr. 9, 1918.
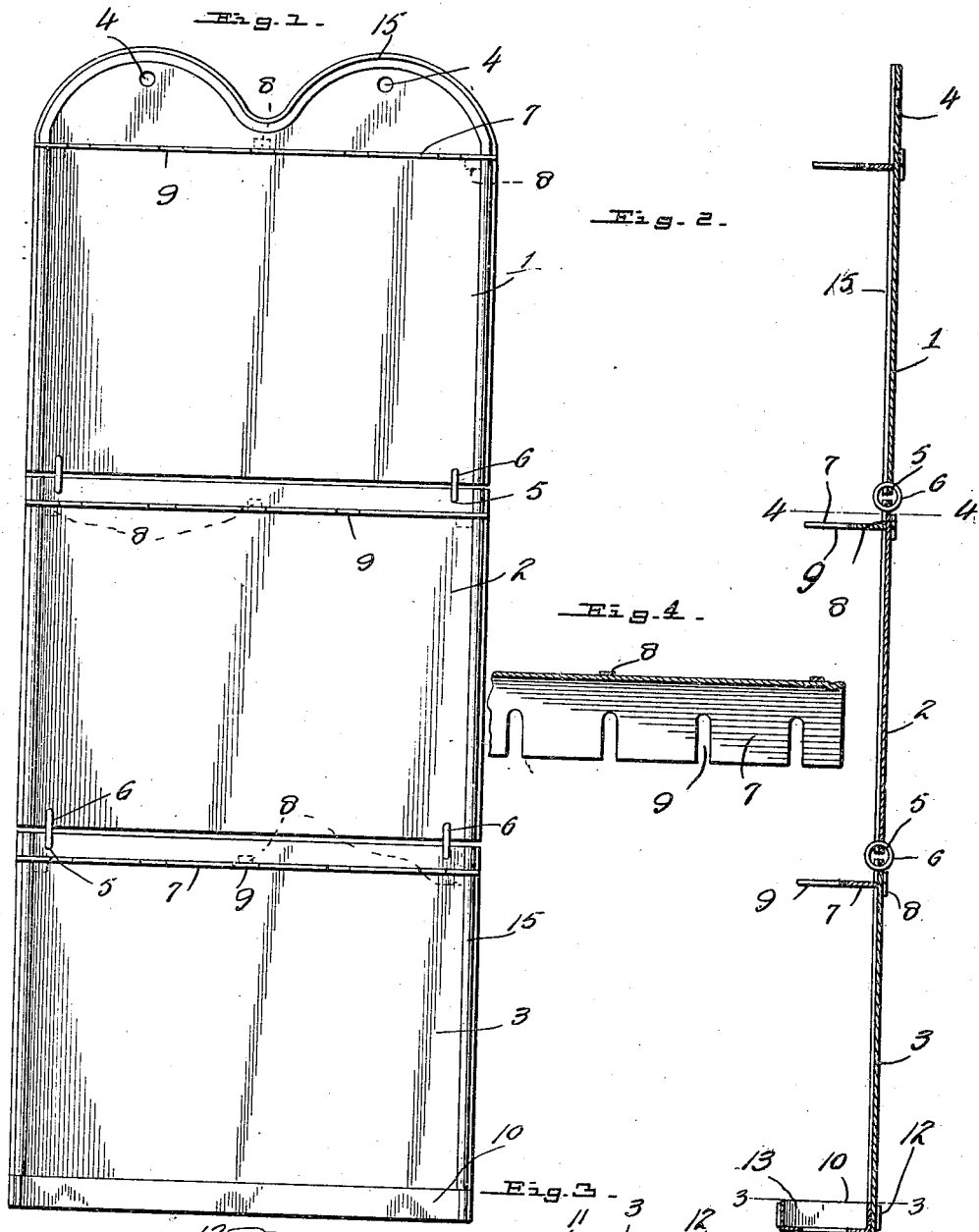
INVENTOR
Carl F. Hilgeman,
Joseph C. Patterson
Charles E. Graham
WITNESSES
BY
ATTORNEY

UNITED STATES PATENT OFFICE.

CARL F. HILGEMAN, JOSEPH CHARLTON PATTERSON, AND CHARLES ETHAN GRAHAM, OF FORT WAYNE, INDIANA.

ARTICLE-HOLDER.

1,262,493.  Specification of Letters Patent.  Patented Apr. 9, 1918.

Application filed January 17, 1916. Serial No. 72,576.

*To all whom it may concern:*

Be it known that we, CARL F. HILGEMAN, JOSEPH C. PATTERSON, and CHARLES E. GRAHAM, citizens of the United States, residing at Fort Wayne, in the county of Allen and State of Indiana, have invented certain new and useful Improvements in Article-Holders, of which the following is a specification.

Our invention relates to article holders and more particularly to a folding kitchen utensil holder.

The primary object of our invention resides in the provision of a novel holder comprising a plurality of collapsible sections, novel connecting means being associated with the adjacent ends of the sections for facilitating the folding of the sections.

Another object of our invention resides in the provision of a novel means for securing supporting shelves to each of the sections, said shelves being particularly adapted for removably supporting kitchen utensils.

A further object of our invention resides in the provision of a novel receptacle or pan as well as the means for removably securing the pan to one of the sections.

A still further object of our invention resides in the provision of a device of the character described that is simple in construction, efficient in operation and one that can be manufactured and placed upon the market at a minimum cost.

Other objects as well as the nature, characteristic features, and scope of our invention will be more readily understood from the following description taken in connection with the accompanying drawings and pointed out in the claims forming a part of this specification.

In the drawings:—

Figure 1 is a front elevational view of our invention;

Fig. 2 is a vertical sectional view of our invention;

Fig. 3 is a transverse sectional view taken on line 3—3 of Fig. 2; and

Fig. 4 is a fragmentary transverse sectional view taken on line 4—4 of Fig. 2.

Referring more particularly to the drawings in which similar reference numerals designate like and corresponding parts throughout the different views, we provide our improved holder in the present instance comprising a plurality of sections. As illustrated in the drawings, we provide a top section 1, an intermediate section 2, and a bottom section 3. It will be understood that any desired number of intermediate sections 2 may be used to provide a holder of a desired length or size. The top section has its upper edge extended and provided with openings 4 which facilitate the securing of the holder to a suitable main support through the medium of any suitable devices (not shown).

For the purpose of movably connecting the sections so that the holder may be folded or collapsed, we have provided the adjacent edges of the sections with a number of openings 5 in which are connected rings 6. In order to support various kitchen utensils on the various sections, we have connected to each of the sections adjacent the upper edges thereof, one of our improved supporting shelves 7. From the rear edge of each of the sections project a plurality of uniformly spaced tongues 8 which engage openings in the sections and are bent alternately in opposite directions into intimate contact with the rear faces of each of the sections. The front edge of each of the shelves 7 is provided with a plurality of uniformly spaced inwardly extending slots 9 for receiving the shanks of various kitchen implements (not shown). A rectangular receptacle 10 is associated with the lower edge of the bottom section 3 and engagement with the section is maintained through the medium of tongues 11 which engage suitable openings in the section 3 through the medium of the ends 12 of the end pieces 13 of the receptacles, which ends 12 are bent angularly and engaged upon the rear surfaces of the section 3. The bottom of the receptacle is provided with a plurality of openings 14 which receive the bottoms of various articles for supporting them. Ribs 15 are formed by raising the sections adjacent the outer edges thereof. These ribs 15 extend throughout the configuration of the holder and serve as an ornament to make the holder pleasing to the eye when manufactured. It will also be readily apparent that these ribs coöperate with the shelves and prevent undue movement thereof and incidentally serve as a means for reinforcing the sections.

Although we have shown and described the preferred embodiment of our invention, we desire it to be understood that we are not to be limited to the exact details shown, however, we desire that great stress be laid upon the arrangement of the collapsible sections and the shelves, and means for connecting the shelves to the sections.

In manufacturing, the device can be formed from blanks of sheet metal and assembled in the manner described. It is obvious that we are not limited to this method of manufacturing.

From the above description taken in connection with the accompanying drawings, it can be easily seen that we have provided a device that is simple in construction, containing but a few simple parts that can be manufactured and assembled and when assembled can be manufactured and placed upon the market at a minimum cost.

It will be understood that the above description and accompanying drawings comprehend only the general embodiment of our invention and various minor changes in detail of construction, proportion and arrangement of parts may be made within the scope of the appended claims and without sacrificing any of the advantages of our invention.

Having thus fully described our invention, what we claim as new and desire to secure by Letters Patent, is:

1. A foldable article holder including a plurality of slotted sections, means for movably connecting the sections together, a plurality of article supporting shelves, tongues extending from each of the shelves for connecting one of the shelves to the upper end of each of the sections, an article receiving receptacle, tongues on the ends of the article receiving receptacle for engagement with the lower end of the lower sections, said tongues formed upon the shelves and receptacle being adapted to coöperate with the slots formed in the sections, an extension on the upper sections provided with openings for facilitating the securing of the holder to a suitable support, each of the sections being provided with ribs adjacent their side edges for preventing movement of the shelves and for strengthening the sections.

2. As a new article of manufacture, a foldable article holder formed of flat pieces of material constituting sections which are hingedly connected together, said sections having slots adjacent one edge, shelves having bent tongues to engage with the slots, each of said shelves being composed of flat material and provided with open ended slots on the side opposite the tongues, and attaching to the bottom section, adjacent its lower end, an open receptacle provided with tongues to engage and coöperate with suitable slots formed in said latter section, and a stiffening rib formed adjacent the sides and one end, which end has holes therein so that the holder may be supported and suspended, and when said article is folded it is substantially rectangular in shape.

In testimony whereof we affix our signatures in presence of two witnesses.

CARL F. HILGEMAN.
  JOSEPH CHARLTON PATTERSON.
  CHARLES ETHAN GRAHAM.

Witnesses:
 O. E. BLY,
 Mrs. C. F. HILGEMAN.